United States Patent
Hook

(10) Patent No.: US 11,227,587 B2
(45) Date of Patent: Jan. 18, 2022

(54) METHOD, APPARATUS, AND COMPUTER-READABLE STORAGE MEDIUM FOR ADAPTIVE NULL-VOICE CANCELLATION

(71) Applicant: Peiker acustic GmbH, Friedrichsdorf (DE)

(72) Inventor: Brandon Hook, Troy, MI (US)

(73) Assignee: Peiker acustic GmbH, Friedrichsdorf (DE)

( * ) Notice: Subject to any disclaimer, the term of this patent is extended or adjusted under 35 U.S.C. 154(b) by 0 days.

(21) Appl. No.: 16/725,920

(22) Filed: Dec. 23, 2019

(65) Prior Publication Data
US 2021/0193131 A1 Jun. 24, 2021

(51) Int. Cl.
| | | |
|---|---|---|
| *G10L 15/20* | (2006.01) | |
| *G10L 15/22* | (2006.01) | |
| *G10L 25/84* | (2013.01) | |
| *H04R 1/40* | (2006.01) | |
| *H04R 3/00* | (2006.01) | |
| *G10L 21/0232* | (2013.01) | |
| *G10L 21/0216* | (2013.01) | |

(52) U.S. Cl.
CPC ............ *G10L 15/20* (2013.01); *G10L 15/22* (2013.01); *G10L 21/0232* (2013.01); *G10L 25/84* (2013.01); *H04R 1/406* (2013.01); *H04R 3/005* (2013.01); *G10L 2021/02166* (2013.01)

(58) Field of Classification Search
CPC ......... G10L 25/84; G10L 25/21; G10L 15/22; G10L 15/20; G10L 21/0232; G10L 21/0364; G10L 21/0208; G10L 21/034; G10L 2021/02166; G10L 2021/02165; H04R 3/005; H04R 1/406
See application file for complete search history.

(56) References Cited

U.S. PATENT DOCUMENTS

| 10,147,439 B1 * | 12/2018 | Kristjansson ............. G01S 5/18 |
| 2007/0088544 A1 | 4/2007 | Acero et al. |
| 2012/0310637 A1 * | 12/2012 | Vitte .................... G10L 21/0208 704/226 |

* cited by examiner

*Primary Examiner* — Yogeshkumar Patel
(74) *Attorney, Agent, or Firm* — Oblon, McClelland, Maier & Neustadt, L.L.P.

(57) ABSTRACT

The present disclosure relates to a method, apparatus, and computer-readable storage medium that modulate an audio output of a microphone array in order to isolate speech of a talker in a vehicle. For instance, the present disclosure describes a method for modulating an audio output of a microphone array, comprising receiving two or more audio signals from two or more microphone capsules in the microphone array, each audio signal comprising a response to acoustic stimuli in an environment perceived by a respective microphone capsule of the microphone array, estimating an acoustic noise contribution level of the environment based on the received audio signals, estimating a voice contribution level of the environment based on the received audio signals, and determining, by processing circuitry, a direct voice contribution level of the environment based on the estimated acoustic noise contribution level of the environment and the estimated voice contribution level of the environment.

20 Claims, 7 Drawing Sheets

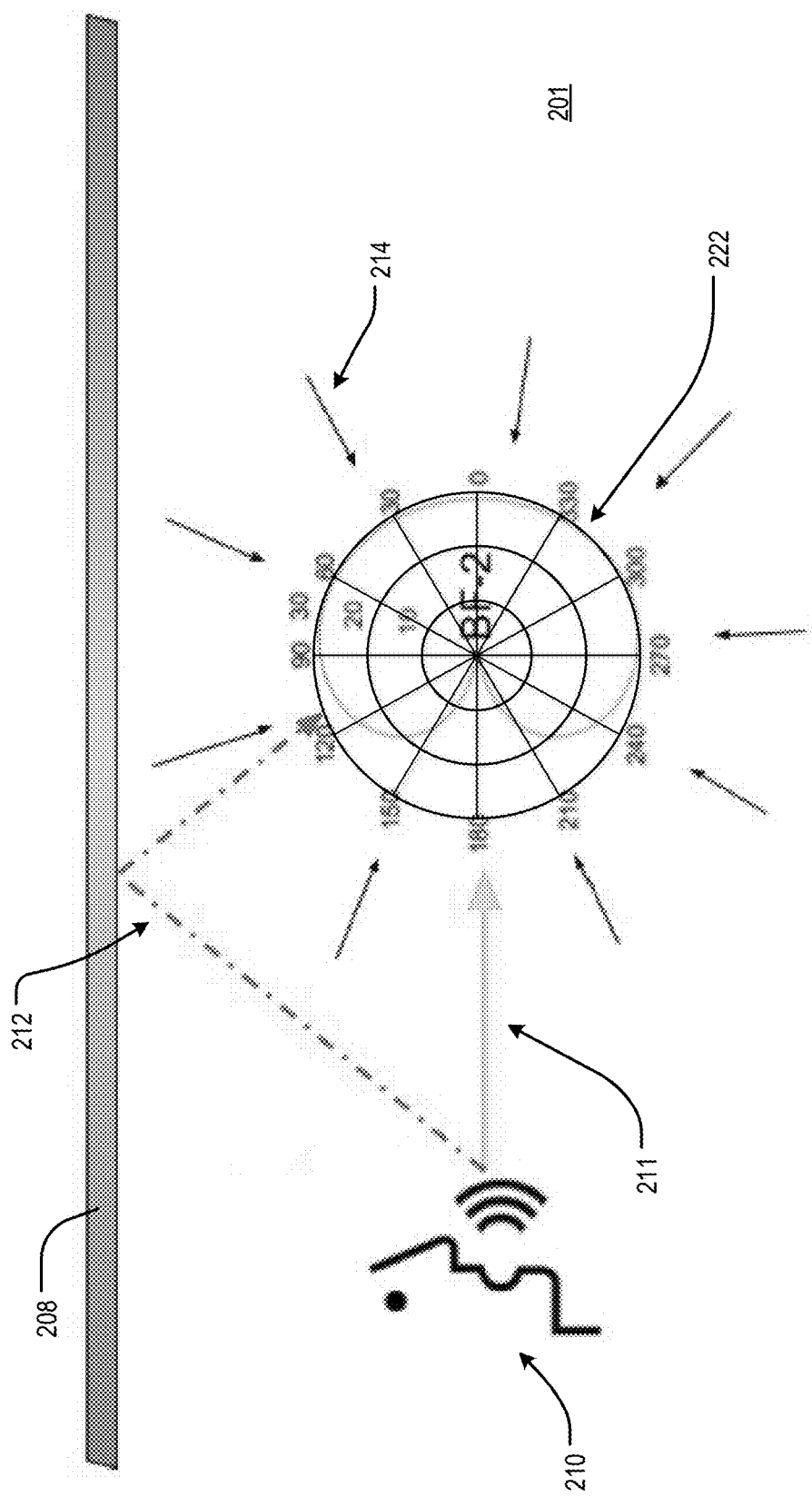

METHOD, APPARATUS, AND COMPUTER-READABLE STORAGE MEDIUM FOR ADAPTIVE NULL-VOICE CANCELLATION

BACKGROUND

Field of the Disclosure

The present disclosure relates to, among others, voice recognition and hands-free calling in a noisy environment wherein acoustic reflections may be prominent. In particular, the present disclosure relates to operation and control of an in-car communication system of a vehicle.

Description of the Related Art

Communication between passengers of a vehicle, particularly when traveling at moderate or high speeds, can be made difficult by road noise, engine noise, audio noise, and other types of elevated ambient sounds. To this end, in-car communication systems aim to augment natural hearing by providing enhanced communication features. Such systems can be effective in facilitating conversation between passengers in a rear of the vehicle and passengers in a front of the vehicle. Even so, the high reflectivity surfaces of the interior of a vehicle create an environment that complicates the isolation and reproduction of intended speech amongst reflected speech and vehicle noise, for instance. Such surfaces affect the ability of microphones of an in-car communication system to isolate speech from reflections and produce audio with high fidelity. For instance, such an environment may result in a voice that appears to be artificially filtered (e.g., voice in a tin can or voice in a tunnel). Accordingly, the present disclosure introduces an approach for ensuring sound fidelity in a high noise auditory environment.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, apparatus, and computer-readable storage medium comprising processing circuitry configured to perform a method for modulating an audio output of a microphone array.

According to an embodiment, the present disclosure further relates to a method for modulating an audio output of a microphone array, comprising receiving two or more audio signals from two or more microphone capsules in the microphone array, each audio signal comprising a response to acoustic stimuli in an environment perceived by a respective microphone capsule of the microphone array, estimating an acoustic noise contribution level of the environment based on the received audio signals, estimating a voice contribution level of the environment based on the received audio signals, and determining, by processing circuitry, a direct voice contribution level of the environment based on the estimated acoustic noise contribution level of the environment and the estimated voice contribution level of the environment.

According to an embodiment, the present disclosure further relates to an apparatus for modulating an audio output of a microphone array, comprising processing circuitry configured to receive two or more audio signals from two or more microphone capsules in the microphone array, each audio signal comprising a response to acoustic stimuli in an environment perceived by a respective microphone capsule of the microphone array, estimate an acoustic noise contribution level of the environment based on the received audio signals, estimate a voice contribution level of the environment based on the received audio signals, and determine a direct voice contribution level of the environment based on the estimated acoustic noise contribution level of the environment and the estimated voice contribution level of the environment.

According to an embodiment, the present disclosure further relates to a non-transitory computer-readable storage medium storing computer-readable instructions that, when executed by a computer, cause the computer to perform a method for modulating an audio output of a microphone array, the method comprising receiving two or more audio signals from two or more microphone capsules in the microphone array, each audio signal comprising a response to acoustic stimuli in an environment perceived by a respective microphone capsule of the microphone array, estimating an acoustic noise contribution level of the environment based on the received audio signals, estimating a voice contribution level of the environment based on the received audio signals, and determining a direct voice contribution level of the environment based on the estimated acoustic noise contribution level of the environment and the estimated voice contribution level of the environment.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2B is an illustration of a polar pattern of a beamformer, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures or characteristics may be combined in any suitable manner in one or more embodiments without limitation.

According to an embodiment, the present disclosure describes an apparatus and method of modulating an audio output of a microphone array that is capable of discerning the varied acoustic environment, or sound field, of the noise environment. In an embodiment, the apparatus and method of the present disclosure can be implemented within a microphone array including a plurality of microphones (e.g., two or more microphones). The apparatus and method of the present disclosure, as detailed in the remainder of the disclosure, is capable of generating high signal-to-noise enhancement in a diffuse noise field.

Figure 1:
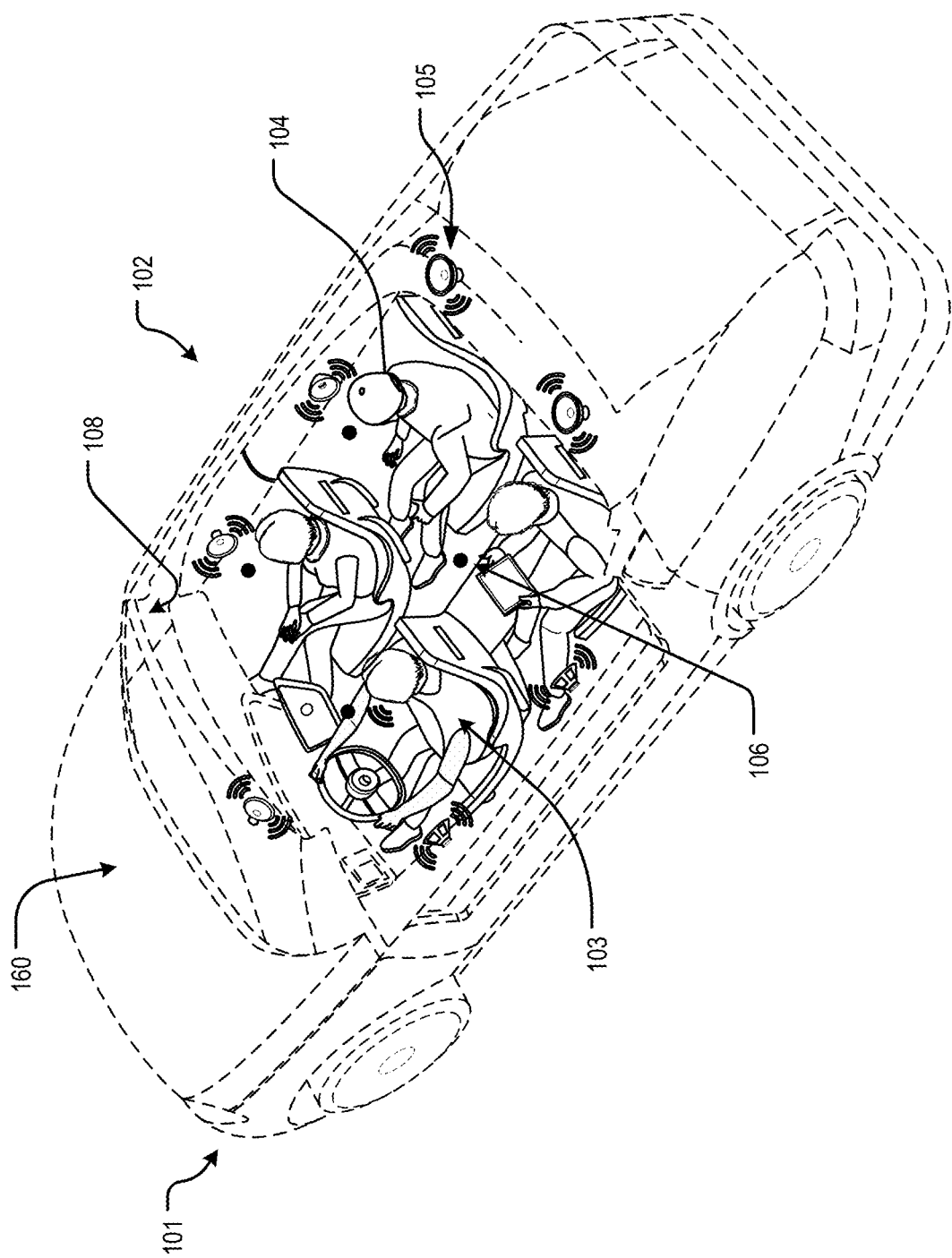
FIG. 1 is an illustration of an in-car communication system of a vehicle, according to an exemplary embodiment of the present disclosure.

According to an embodiment, the present disclosure will be described in view of exemplary embodiments. For instance, though applicable within a microphone array across varied compositions of noise environments, the present disclosure will be described in view of an in-car communication system, as the vehicular environment presents a unique set of challenges. Accordingly, FIG. 1 is an annotated illustration of an in-car communication system 102 of a vehicle 101. The vehicle 101 may include an electronics control unit (ECU) 160 configured to perform a method of the in-car communication system 102, such as a method of modulating an audio output of a microphone array. The ECU 160 may be in communication with and control of a plurality of microphones 106 of the vehicle 101 and a plurality of speakers 105 of the vehicle 101. Each of the plurality of microphones 106 of the vehicle 101 can be mounted throughout a cabin 108 of the vehicle 101, including within a headliner of the vehicle 101, as shown in an exemplary embodiment of FIG. 1. It can be appreciated that the cabin 108 of the vehicle 101 includes, as a function of vehicle assembly, acoustically-reflective surfaces such that sound generated from or existing within the cabin 108 of the vehicle 101 may be at least partially reflected by the acoustically-reflective surfaces of the cabin 108 of the vehicle 101. In an embodiment, a portion of the plurality of microphones 106 of the vehicle 101 may form a microphone array, as is the focus of the present disclosure. Each of the microphones may be an omnidirectional microphone, a unidirectional microphone, a bi-directional microphone, and the like, as appropriate. As shown in FIG. 1, a plurality of passengers 104 can be in the vehicle 101, including a driver 103. It should be noted that 'microphone' and 'microphone capsule' may be used interchangeably through the present disclosure and are intended to suggest similar devices for detecting and transducing acoustic signals.

Under standard operation of the in-car communication system 102 of the vehicle 101, speech from each of the plurality of passengers 104 of the vehicle 101 can be enhanced and transmitted to each of the other passengers of the plurality of passengers 104 of the vehicle 101 to ensure that communication is not impeded and that all passengers have the opportunity to participate in vehicle conversation. In practice, however, such operation is often impeded by acoustic noise that includes noise of the environment of the vehicle and speech reflections from speech of passengers of the vehicle. Such speech reflections, as an example, may be compounded by the high reflectivity environment of the cabin 108 of the vehicle 101, such an environment allowing sounds generated within the cabin 108 to be at least partially reflected and contained within the interior of the vehicle 101.

In a vehicle, such as the vehicle 101 of FIG. 1, acoustic noise can be generated by a heating, ventilation, and air conditioning system, by wind hitting the outside of the vehicle, by contact between the tire and the road surface, by other events outside the vehicle, including horns, sirens, and the like, and by competing talkers in the vehicle (i.e., passengers), Noise generated by a heating, ventilation, and air conditioning system, by wind hitting the outside of the vehicle, by contact between the tire and the road surface, and by other events outside the vehicle, including horns, sirens, and the like, are non-limiting examples of what will be referred to as 'vehicle noise'. Noises generated by competing talkers in the vehicle (i.e., passengers) are non-limiting examples of what will be referred to herein as 'speech reflections'. These competing talkers, in addition to an original talker or speech origin, as in the case of the present disclosure, can have a respective acoustic output reflected by the internally reflective environment of the vehicle cabin, thus adding to the noise environment of the vehicle. Therefore, with a variety of possible sources of acoustic noise, including vehicle noise and speech reflections, and owing to the diffuse nature of these sounds, in-car communication systems may struggle to isolate direct speech in a vehicle reproduce the direct speech with high fidelity.

According to an embodiment, the present disclosure describes an apparatus and method of modulating an audio output of a microphone array that is capable of discerning the varied acoustic environment, or sound field, of a vehicle. In an embodiment, the apparatus and method of the present disclosure can be implemented within a microphone array including a plurality of microphones (e.g., two or more microphones). The apparatus and method of the present disclosure, as detailed in the remainder of the disclosure, is capable of generating high signal-to-noise enhancement in a diffuse noise field, as well as a constant polar pattern across a wide frequency range.

Accordingly, the present disclosure describes an apparatus and method for actively estimating a voice signal via a first beamformer, estimating a noise signal via a second beamformer, and isolating a direct voice signal from an output of the first beamformer according to an output of the second beamformer. In an embodiment, two or more audio signals may be received by an ECU of a vehicle from two or more microphone capsules, or microphones, in a microphone array, each received audio signal comprising a response to acoustic stimuli in a sound field as perceived by a respective microphone capsule of the microphone array. Each of the two or more microphone capsules may be arranged within a single microphone array or across a variety of microphone arrays, as appropriate. An acoustic noise contribution level of the environment may be estimated based on the received audio signals, and a voice contribution level of the environment may be estimated based on the received audio signals. The acoustic noise contribution level can reflect an estimation of a noise contribution level in the absence of speech (e.g., vehicle noise) and a noise contribution level in the presence of speech (i.e. speech reflections). A direct voice contribution level of the environment may be determined based on the estimated acoustic noise contribution level of the environment and the estimated voice contribution level of the environment, wherein the estimated acoustic noise contribution level can be used to update an adaptive filter configured to isolate the direct voice contribution level.

In an embodiment, and when direct speech is present in the vehicle, an output of the second beamformer may include speech reflections and noise such as vehicle noise, electrical noise, and the like. Accordingly, in the absence of speech, vehicle noise, electrical noise, and the like, can be determined by the second beamformer. Subsequently, in the presence of speech, speech reflections can be determined by the second beamformer as contributions of noise are already known. From this, a model and/or weights of the adaptive filter can be extracted in order to generate a second input to control the adaptive filter. It can be appreciated that the adaptive filter may be a subtractive filter.

According to an embodiment, the present disclosure describes a method to optimize signal-to-noise ratio by removing noise and speech reflections from the estimated voice contribution level. To this end, a first beampattern, of a first beamformer, created from multiple microphone capsules can be tuned to maximize signal-to-noise ratio (i.e., voice power relative to background noise and speech reflections) using methods which maintain a consistent polar pattern response independent of frequency. A second beampattern, of a second beamformer, can be created similarly, the second beamformer being designed in order to capture acoustic noise including vehicle noise and speech reflections, excepting a direct speech signal from a speech origin. In other words, a null can be placed toward the speech origin, corresponding to a primary acoustic path of a direct speech signal, thereby allowing for reception of acoustic noise including vehicle noise and speech reflections while attenuating the direct speech signal.

According to an embodiment, the estimated acoustic noise contribution level output from the second beamformer may be used, in the absence of speech, as a baseline measure of vehicle noise. In an embodiment, the estimated acoustic noise contribution level output from the second beamformer may be used, in the presence of speech and speech reflections, as determined by a voice activity detector, as a measure of vehicle noise and speech reflections. Accordingly, the second beamformer allows for the isolation of vehicle noise as well as speech reflections. Exploits of the second beamformer will be further described below in the isolation of direct speech.

As introduced above and based on the diffuse sound field of the vehicle, acoustic noise, including speech reflections, vehicle noise, and the like, may be present both in an output of the first beamformer and in an output of the second beamformer. Due to the design of the first beamformer and the second beamformer, however, speech reflections and vehicle noise, for instance, will be comparatively greater than a direct speech signal in the output of the second beamformer. This enhanced acoustic noise and speech reflections-to-voice ratio signal, therefore, can be used as reference signals in an adaptive filter to remove corresponding portions of these signals in the output of the first beamformer. Applying the adaptive filter to the output of the first beamformer, the modified output of the first beamformer may be an output signal which minimizes acoustic noise while maximizing direct speech. In this way, the method, apparatus, and computer-readable storage medium of the present disclosure provide an isolated direct speech signal that may be used by an ECU of the vehicle to perform functions of the in-car communication system.

Figure 2A:
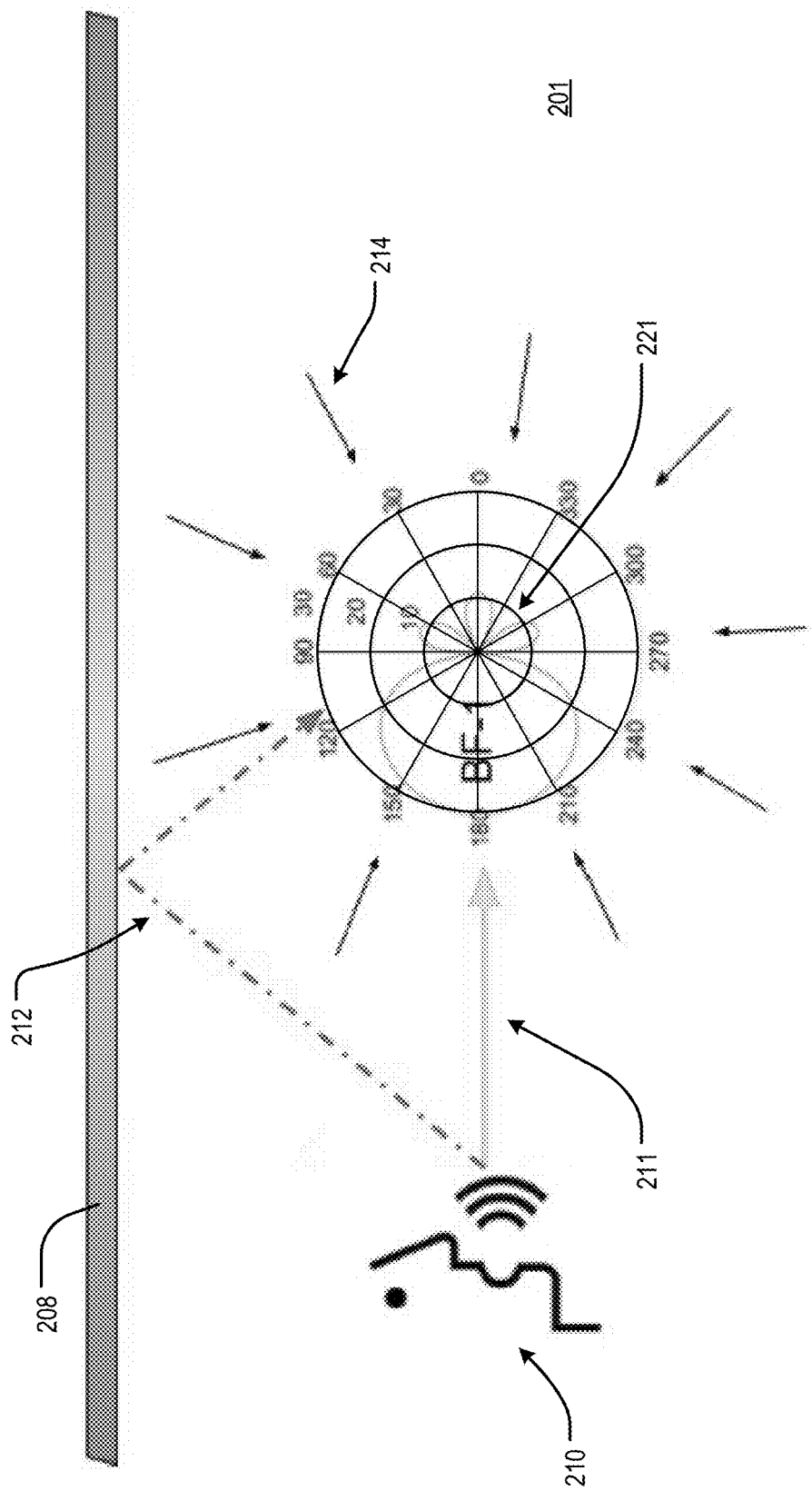
FIG. 2A is an illustration of a polar pattern of a beamformer, according to an exemplary embodiment of the present disclosure.

Returning now to the Figures, FIG. 2A and FIG. 2B provide illustrations of polar patterns of beamformer designs, according to exemplary embodiments of the present disclosure and as applied to a cabin environment of a vehicle 201. It can be appreciated that the beampatterns of the beamformers in FIG. 2A and FIG. 2B merely represent functional outcomes of the beamformer designs. In reality, sounds of the cabin (e.g., speech, vehicle noise, etc.) may be received by microphones of a microphone array, the outputs of which may be processed according to each of the beamformer designs of FIG. 2A and FIG. 2B in order to generate a desired, processed beamformer output.

Regarding FIG. 2A, a speech origin 210 may be a driver or a passenger of the vehicle 201. A portion of speech from the speech origin 210 may be directed to microphones of a microphone array along a direct speech path 211, the direct speech path 211 being denoted by a thick arrow, the microphone array being represented herein and referred to hereinafter as a first beamformer (i.e., BF-1) 221. Considering features of a typical acoustic environment of the vehicle 210, the microphones may receive additional sounds in the form of speech reflections 212 and noise 214 (e.g., vehicle noise), the speech reflections 212 being denoted by a hashed arrow and the noise 214 being denoted by a plurality of thin arrows. The speech reflections 212 may be the result of an acoustically-reflective environment such as a cabin 208 of the vehicle 201, the cabin 208 of the vehicle 201 including a variety of hard surfaces that readily reflect sound back into the interior of the vehicle 201. In order to capture, primarily, direct speech spoken by the speech origin 210 and directed along the direct speech path 211, the first beamformer 221 may be configured such that a receiving lobe of the first beamformer 221 is directed at the speech origin 210 along the direct speech path 211, Ideally, such beamformer design would perfectly capture the direct speech and maximize a speech signal-to-noise ratio (sSNR). However, because of the above-described extraneous noise sources, an output of the first beamformer 221 is contaminated with acoustic noise of the vehicle environment, including the noise 214 of the vehicle 201 and the speech reflections 212 compounded by the cabin 208 of the vehicle 201.

In order to account for the contamination of the output of the first beamformer 221 and to maximize a sSNR, the method of the present disclosure combines the first beamformer design 221, as described in FIG. 2A, with a second beamformer design, as described in FIG. 2B, the second beamformer design being configured to receive, primarily, acoustic noise of the sound field, the acoustic noise including vehicle noise and speech reflections. In this way, an output of the second beamformer design can be used as a reference from which to isolate direct speech from the output of the first beamformer design and, thereby, maximize sSNR.

Accordingly, with reference to FIG. 2B, and similar to FIG. 2A, a speech origin 210 may be a driver or a passenger of a vehicle 201. A portion of speech from the speech origin 210 may be directed to microphones of a microphone array along a direct speech path 211, the direct speech path 211 being denoted by a thick arrow, the microphone array being represented herein and referred to hereinafter as a second beamformer (i.e., BF-2) 222. Considering features of a typical acoustic environment of the vehicle 210, the microphones may receive additional sounds in the form of speech reflections 212 and noise 214 (e.g., vehicle noise), the speech reflections 212 being denoted by a hashed arrow and the noise 214 being denoted by a plurality of thin arrows. The speech reflections 212 may be the result of an acoustically-reflective environment such as a cabin 208 of the vehicle 201, the cabin 208 of the vehicle 201 including a variety of hard surfaces that readily reflect sound back into the interior of the vehicle 201. As introduced, the second beamformer 222 may be configured to receive, primarily, acoustic noise of the vehicle environment, including vehicle noise and speech reflections. To this end, a receiving lobe of a beampattern of the second beamformer 222 may be directed away from the speech origin 210 along the direct speech path 211, effectively creating a 'null' in the direction of the speech origin 210 (i.e. 180°). In this way, and as described in detail in the remainder of the present disclosure, the output of the first beamformer may be contextualized by the output of the second beamformer 222, a resulting, modified output of the first beamformer thereby maximizing sSNR.

Figure 3:
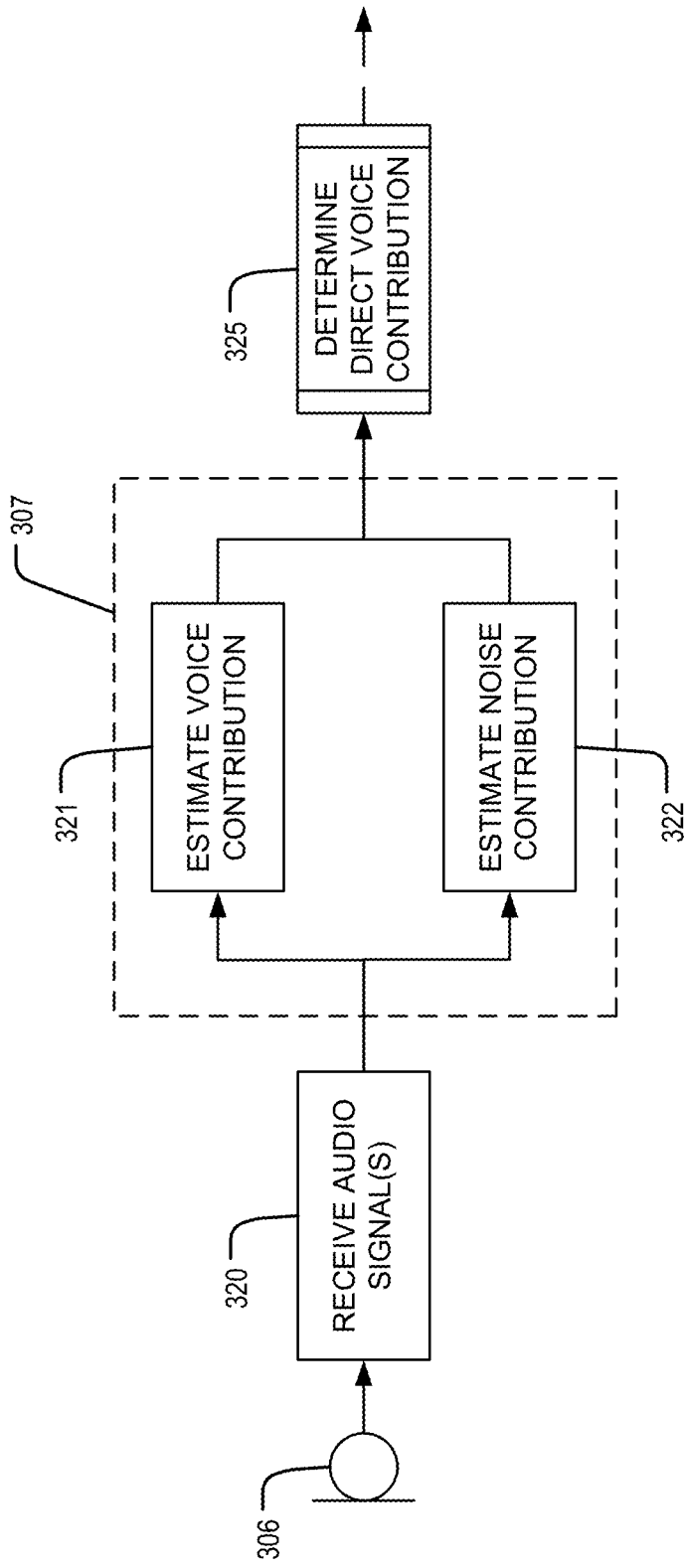
FIG. 3 is a high-level flow diagram of a process of modulating an audio output of a microphone array, according to an exemplary embodiment of the present disclosure.

Turning now to FIG. 3, FIG. 3 is a flow diagram of a method, generally introduced above, according to an exemplary embodiment of the present disclosure. The flow diagram of FIG. 3 introduces a method of modulating an audio output of a microphone array in order to isolate direct speech from a speech origin, the method employing one or more beamformers similar to that introduced above. The method of FIG. 3 can be performed by an ECU of a vehicle, as introduced with reference to the in-ear communication system of FIG. 1 and as will be described in more detail with reference to FIG. 6.

At step 320, audio signals captured at microphones 306 of a microphone array may be received by the ECU of the vehicle.

At step 321 and at step 322, corresponding beamformers 307 may be applied to the audio signals received at step 320 in order to estimate a voice contribution and noise contribution, respectively. A first beamformer design of the corresponding beamformers 307 can be applied at step 321, the first beamformer design being configured to primarily receive direct speech. A second beamformer design of the corresponding beamformers 307 can be applied at step 322, the second beamformer design being configured to primarily receive speech reflections and vehicle noise.

At sub process 325, the estimated voice contribution from step 321 and the estimated noise contribution from step 322 may be used to determine a direct voice contribution. Sub process 325 may include, for instance, an adaptive filter for updating filter parameters of a transfer function according to the estimated noise contribution at step 322. In an example, the estimated noise contribution at step 322 may be an estimated vehicle noise contribution determined in the absence of speech. In the presence of speech, the estimated noise contribution at step 322 may be an estimated vehicle noise contribution and an estimated speech reflections contribution. The updated adaptive filter can then be applied to the estimated voice contribution from step 321 in order to isolate a direct voice contribution.

According to an embodiment, the isolated direct voice contribution from sub process 325 can then be used by the ECU of the vehicle in performing functions of the in-car communication system (denoted by hashed line from step 325).

Figure 4:
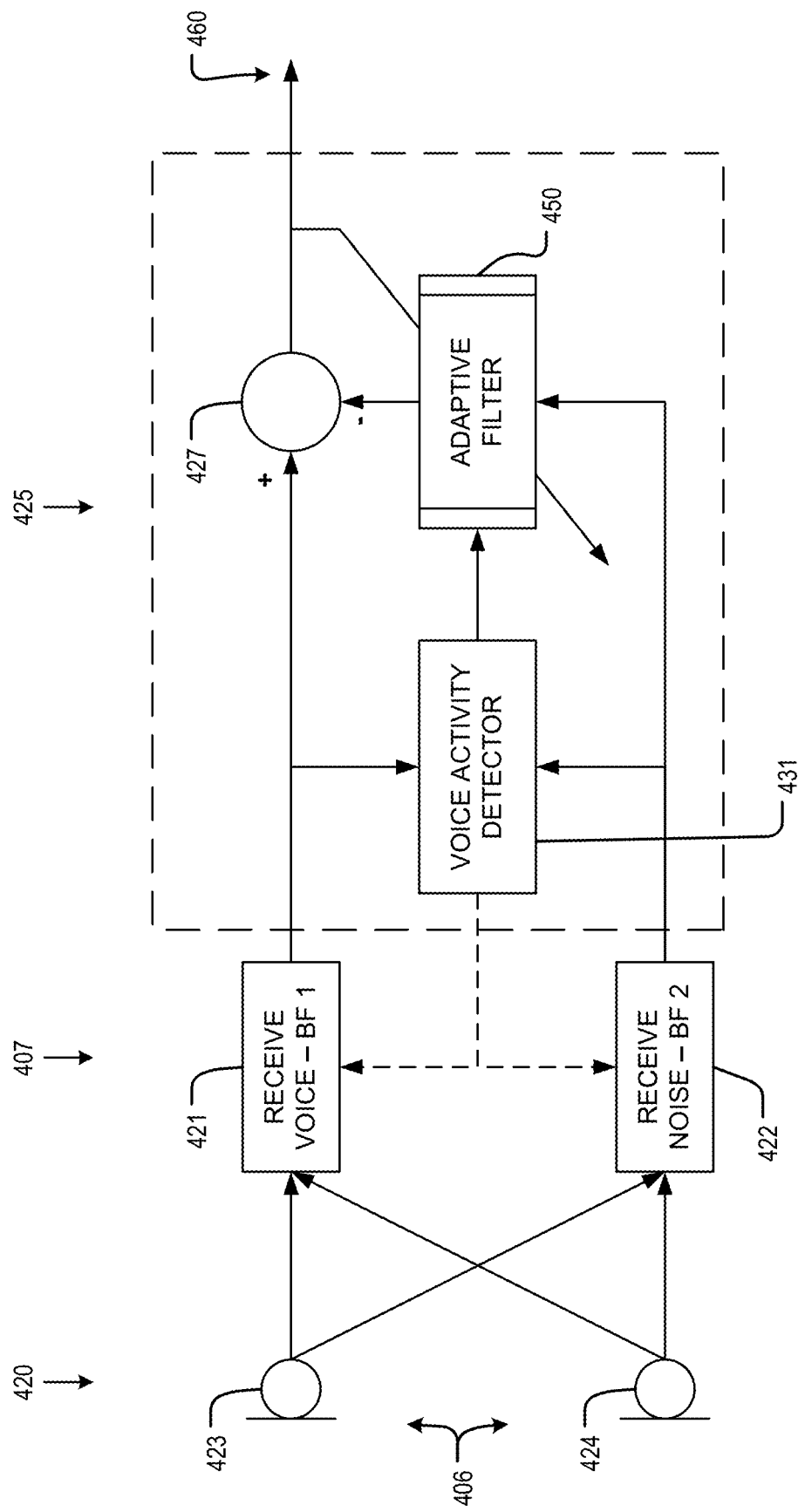
FIG. 4 is a flow diagram of a process of modulating an audio output of a microphone array, according to an exemplary embodiment of the present disclosure.

Turning now to FIG. 4, FIG. 4 is a flow diagram describing an exemplary embodiment of the method of the present disclosure, as generally introduced in FIG. 3.

As in FIG. 3, audio signals from each of two or more microphones 406 may be received, pursuant to step 420, by an ECU of a vehicle and processed according to one or more beamformers at step 407. Specifically, an audio signal from a first microphone 423 and an audio signal from a second microphone 424 may each be received by the ECU of the vehicle and processed according to a first beamformer, at step 421, and according to a second beamformer, at step 422. The first beamformer, at step 421, can be configured to direct a lobe of a beampattern toward a speech origin, thereby primarily capturing a voice of the speech origin amongst a diffuse sound field. The second beamformer, at step 422, can be configured with a null directed at the speech origin, a lobe of a beampattern of the second beamformer being directed away from the speech origin, the beampattern having a shape resembling a polar pattern of a cardioid microphone. In this way, the second beamformer can be configured to capture acoustic noise, including speech reflections and vehicle noise, amongst the diffuse sound field. Outputs of each of the beamformers generated at step 421 and step 422 may be passed to sub process 425 (denoted by long hashed lines) wherein a direct voice contribution can be determined. The output of the first beamformer, generated at step 421, may be concurrently passed to a mixer 427, the mixer being able to apply the adaptive filter of sub process 450, The output of the second beamformer, generated at step 422, may be concurrently passed to sub process 450. Sub process 425, as outlined in FIG. 4, can include step 431 and sub process 450. According to an embodiment, and in order to determine the direct voice contribution, sub process 425 defines an approach for maintaining an adaptive filter that, when implemented by an ECU, may be configured to estimate and remove acoustic noise, including speech reflections and vehicle noise, from an output of the mixer 427 that includes acoustic noise and direct voice (i.e., direct speech).

To this end, at step 431 of sub process 425, a voice activity detector may be configured to receive the outputs of the beamformers and to determine if speech is present. If it is determined that speech is present in the outputs of the beamformers, the method of FIG. 4 may return to step 421 and to step 422 (denoted by short hashed lines) and step 431 of sub process 425 may be repeated. Concurrently, the output of the first beamformer provided to the mixer 427 may be modified according to current filter parameters of the adaptive filter and the resulting modified output of the first beamformer may be provided to the ECU 460 of the vehicle for implementation with functions of the in-car communication system. However, if it is determined that speech is absent from the outputs of the beamformers, sub process 425 may proceed to sub process 450 wherein the outputs of the beamformers are used to update the adaptive filter. The adaptive filter of sub process 450 may be integrated with the mixer 427 to iteratively update filter parameters of a transfer function of the adaptive filter in real-time in order to provide control of the filter parameters. Accordingly, the output of the first beamformer provided directly to the mixer 427 can be modified according to the updated filter parameters, the modified output of the first beamformer then being provided to the ECU 460 of the vehicle for implementation of functions of the in-car communication system. In an embodiment, during operation, control of the adaptive filter as described above allows for updating the filter parameters during periods of 'no speech' in context of periods of 'speech' and responsive to a diverse and changing sound field.

In an embodiment, and as introduced above, it may be determined by the voice activity detector at step 431 that no speech is present based on the received outputs of the first beamformer at step 421 and the second beamformer at step 422. This allows the adaptive filter to be updated to understand beamformer outputs when only vehicle noise is present (i.e., when the voice activity detector does not detect speech). Similarly, in an embodiment, it may be determined by the voice activity detector at step 431 that speech is present based on the received outputs of the first beamformer at step 421 and the second beamformer at step 422. Such scenario allows the adaptive filter to be updated to understand beamformer outputs when vehicle noise and speech reflections are both present.

For instance, when the voice activity detector does not detect speech above a predetermined threshold, an estimate of vehicle noise may be updated based on the output of the second beamformer. When the voice activity detector does detect speech greater than the predetermined threshold, an estimate of vehicle noise plus speech reflections may be updated based on the output of the second beamformer. A difference in spectrum between the two outputs, necessarily, discerns the speech reflections as a component of the output of the second beamformer.

In an embodiment, the adaptive filter can be of a standard multi-input Weiner filter topology, wherein weights of speech reflections and vehicle noise are adjusted to arrive at a maximum sSNR output from the first beamformer. In an embodiment, weights applied to the adaptive filter may also be arrived at using a neural network, Gaussian mixture model, and the like, wherein training of a classifier may be used to identify speech reflections from vehicle noise and discern direct speech, thereby.

It can be appreciated that, in this way, the modified output of the first beamformer is a measure of direct speech, reflecting the estimated voice contribution from the microphones 406 of the microphone array while minimizing the contribution of noise, including speech reflections and vehicle noise.

Figure 5:
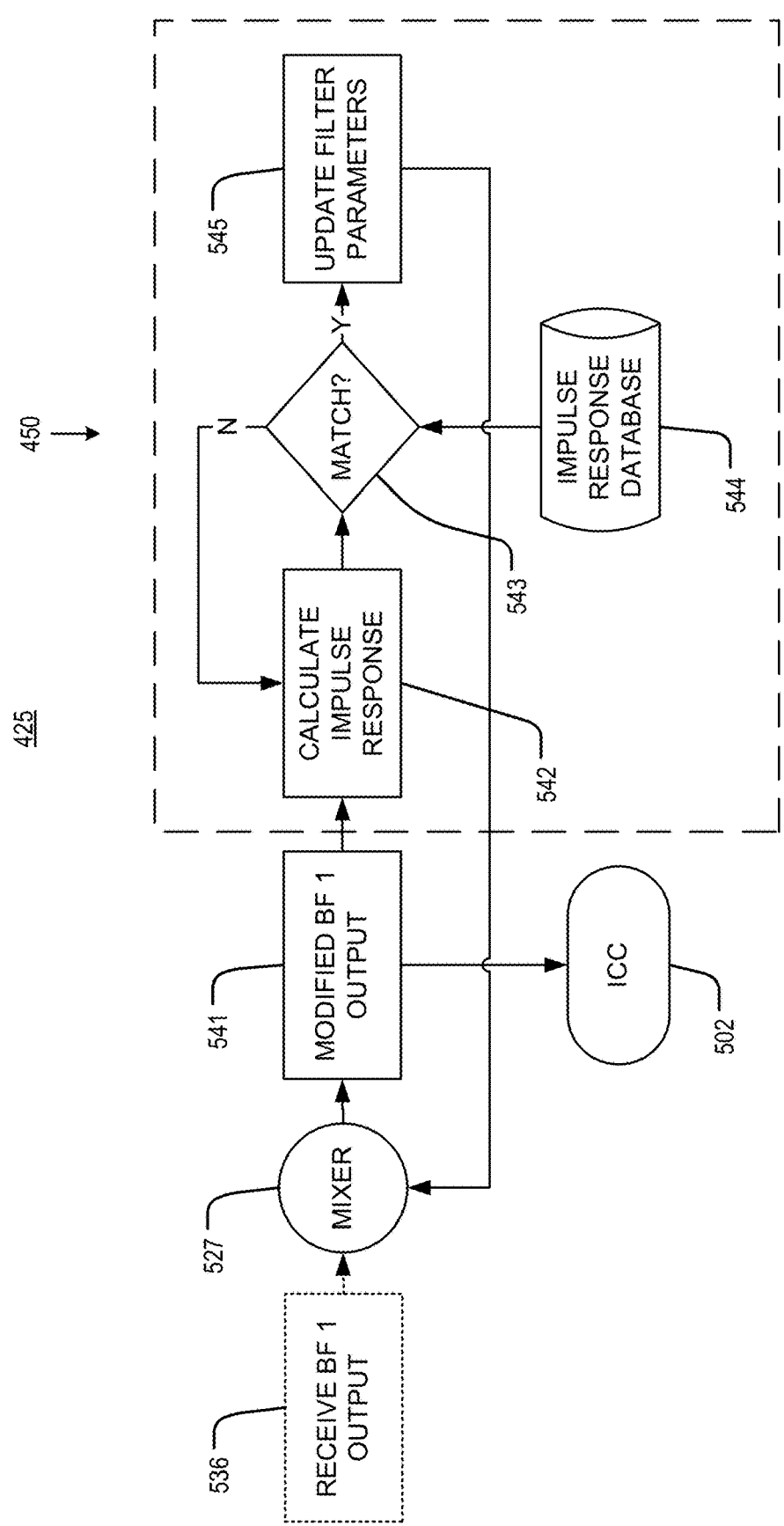
FIG. 5 is a flow diagram of a sub process of a process of modulating an audio output of a microphone array, according to an exemplary embodiment of the present disclosure.

A real-time and iterative implementation of sub process 450 of FIG. 4 will now be described in greater detail with reference to sub process 425 of FIG. 5.

Generally, the adaptive filter of sub process 450 may be updated in real-time by a value comparison of a metric of an output of a mixer 527 and a corresponding expectation of the metric of the output. In an example, the metric of the output may be an impulse response of the output of the mixer 527 and the corresponding expectation of the metric of the output may be a target impulse response. The target impulse response may be an a priori target impulse response. In an example, the target impulse response may be an impulse response of speech reflections. In this way, the adaptive filter of sub process 450 may evaluate the output of the mixer 527 based on the target impulse response of speech reflections to, with consideration to acoustic noise, isolate direct speech from the output of the first beamformer 536.

According to an embodiment, the target impulse response of speech reflections can be determined according to controlled simulations of varied noise environments. To establish a target value or representation of the target impulse response, a number of impulse responses can be measured for a microphone array under test in a controlled environment, the microphone array implementing the first beamformer and the second beamformer of the present disclosure. In an embodiment, and as it relates to direct speech within a quiet vehicle (e.g. no vehicle noise) having the microphone array under test installed in a predetermined location relative to a speech origin, a 'speaking' test signal (e.g. a sine wave sweep) can be generated by a head and torso simulator positioned at the speech origin. It can be appreciated that the head and torso simulator may be another suitable mouth simulator. Aided by time delay spectroscopy or other approach for eliminating speech reflections (e.g., impulse response gating), the impulse response of the microphone array under test may be used as a model of an impulse response of direct speech in the absence of speech reflections or vehicle noise. The impulse response model of direct speech can then be further contextualized by speech reflections. In an embodiment, and as it relates to speech reflections within a quiet vehicle (e.g., no vehicle noise) having the microphone array under test installed in the predetermined location relative to the speech origin, the 'speaking' test signal can be generated by, for example, the head and torso simulator positioned at the speech origin. Without the aid of time delay spectroscopy, or other approach for eliminating speech reflections (e.g. impulse response gating), the impulse response of the microphone array under test may be used as a model of an impulse response of direct speech and speech reflections. Accordingly, by providing context to the impulse response model of direct speech, an impulse response model of speech reflections can be generated from consideration of the above-described impulse response models. Such impulse response model of speech reflections will be used below with reference to FIG. 5.

According to an embodiment, adaptive filter coefficients may be transformed based on the impulse response model of speech reflections and in order to account for the 'calibration' of the microphone array, as described above, such that the modified output of the first beamformer includes direct speech and only residual acoustic noise, speech reflections, and extraneous speech, thereby maximizing sSNR.

According to an embodiment, wherein speech and speech reflections from other passengers may contaminate an output of the first beamformer, a multi-seat and multi-zone voice activity detector may be used in order to subtract out the acoustic signals known to arrive from other auditory zones of the vehicle.

As suggested, the model, or target value, of the impulse response of speech reflections may then be used as a gauge or convergence target in sub process 450 to iteratively update a transfer function and improve, at the mixer 527, the modified output of the first beamformer.

Specifically, and with reference again to FIG. 5, an output of the first beamformer may, initially, be received at step 536. A mixer 527 may generate a modified output of the first beamformer, at step 541, according to a transfer function of an adaptive filter having filter parameters, or coefficients, set to initial values. The initial values may be informed by prior experimentation or may be algorithmically selected. The initial values may be informed by seed values or last known convergence values.

During normal operation, the modified output of the first beamformer, at step 541, may be provided, indirectly, to the in-car communication system 502 and used by the ECU to perform functions of the in-car communication system 502. For purposes of improving the transfer function of the adaptive block, and pursuant to the general description above, an impulse response of the modified output of the first beamformer may be calculated at step 542. At step 543, the calculated impulse response may be compared against a target impulse response acquired from an impulse response database 544. As indicated, the target impulse response may be an impulse response model of speech reflections determined a priori and stored within the impulse response database 544. If the comparison (e.g., correlation) of the calculated impulse response, at step 543, and the target impulse response acquired from the impulse response database 544 is greater than a predetermined threshold, the calculated impulse response and the impulse response model of speech reflections are considered a significant match and sub process 450 proceeds to step 545. At step 545 of sub process 450, the correlation between the calculated impulse response and the target impulse response is used to adjust the adaptive filter coefficients that will be subsequently provided to the mixer 527. In other words, when the correlation is greater than the predetermined threshold, the current modified output of the first beamformer is determined to be contaminated by speech reflections and, accordingly, the coefficients of the adaptive filter may be updated in order to rectify the estimated direct speech. Such iterative behavior allows the adaptive filter to maintain accuracy in modifying the output of the first beamformer to minimize speech reflections and acoustic noise and maximize direct speech signal.

Alternatively, if it is determined at step 543 that the correlation between the calculated impulse response and the impulse response model of speech reflections is less than the predetermined threshold, sub process 450 may return to step 542 and the impulse response may be calculated anew.

According to an embodiment, the filter parameters may be updated based on the correlation and via optimization algorithms, as appropriate. Therefore, it can be appreciated that the above-described predetermined threshold may be a type of cost function defining a correlation between a calculated impulse response and a target impulse response. The closed loop nature of sub process 450 may then, accordingly, be considered as an optimization algorithm which iteratively minimizes the cost function, thereby maximizing sSNR of the modified output of the first beamformer.

According to an embodiment, the adaptive filter of the present disclosure may be a least means squares filter or a recursive least means square filter. In an embodiment, the adaptive filter may be a Weiner filter variety based on least means square, normalized least means square, and the like.

Having updated the filter parameters at step 545, sub process 425, and sub process 450 therein, may return to the mixer 527 in order to modify subsequently received outputs from the first beamformer, at step 536.

Figure 6:
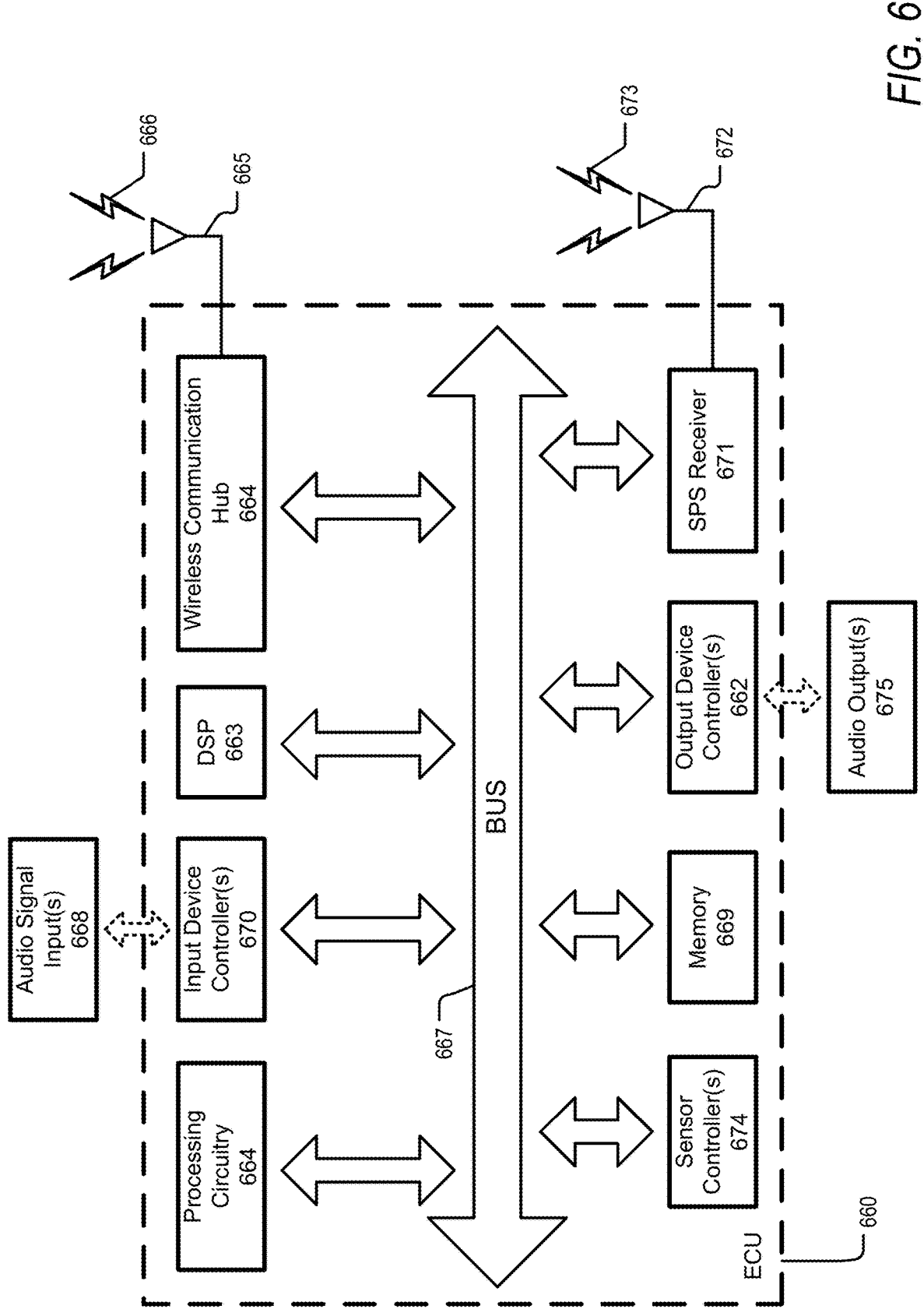
FIG. 6 is a schematic of a hardware configuration of a vehicle employing an in-car communication system, according to an exemplary embodiment of the present disclosure.

The method of the present disclosure, as described above, can be implemented in context of an ECU of a vehicle. Accordingly, FIG. 6 is a schematic of hardware components of an exemplary embodiment of an electronics control unit (ECU) 660 that may be implemented. It should be noted that FIG. 6 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations. Moreover, it can be appreciate that, in an embodiment, the ECU 660 can be configured to process data (i.e. audio signal(s)) and control operation of the in-car communication system. In another embodiment, the ECU 660 can be configured to be in communication with remote processing circuitry configured to, in coordination with the ECU 660, process data and control operation of the in-car communication system. The remote processing circuitry may be a centralized server or other processing circuitry separate from the ECU 660 of the vehicle. The ECU 660 is shown comprising hardware elements that can be electrically coupled via a BUS 667 (or may otherwise be in communication, as appropriate). The hardware elements may include processing circuitry 661 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform operations including, among others, image processing and data processing. Some embodiments may have a separate DSP 663, depending on desired functionality. It can be appreciated that the processes described herein may also be performed via analog circuitry in the absence of the DSP 663.

According to an embodiment, the ECU 660 can include one or more input device controllers 670, which can control without limitation an in-vehicle touch screen, a touch pad, microphone(s), button(s), dial(s), switch(es), and/or the like. In an embodiment, one of the one or more input device controllers 670 can be configured to control a microphone and can be configured to receive audio signal inputs) 668 from one or more microphones of a microphone array of the present disclosure. Accordingly, the processing circuitry 661 of the ECU 660 may execute processes of the processes of the present disclosure responsive to the received audio signal input(s) 668.

In an embodiment, each microphone of a microphone array can be controlled by a centralized digital signal processor via a digital audio bus. In an example, each microphone can be an electret, MEMS, or other, similar type microphone, wherein an output of each microphone can be analog or digital. In an example, the centralized digital signal processor can be one or more distributed, local digital signal processors located at each of the auditory devices. In an example, the digital audio bus may be used for transmitting received audio signals. Accordingly, the digital audio bus can be a digital audio bus allowing for the transmittal of a microphone digital audio signal, such as an A2B bus from Analog Devices, Inc.

According to an embodiment, the ECU 660 can also include one or more output device controllers 662, which can control without limitation a display, a visual indicator such as an LED, speakers, and the like. For instance, the one or more output device controllers 662 can be configured to control audio output(s) 675 of the speakers of a vehicle such that audio output(s) 675 levels are controlled relative to ambient vehicle cabin noise, passenger conversation, and the like.

The ECU 660 may also include a wireless communication hub 664, or connectivity hub, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 664 may permit data to be exchanged with, as described, in part, a network, wireless access points, other computer systems, and/or any other electronic devices described herein. The communication can be carried out via one or more wireless communication antenna(s) 665 that send and/or receive wireless signals 666.

Depending on desired functionality, the wireless communication hub 664 can include separate transceivers to communicate with base transceiver stations (e.g., base stations of a cellular network) and/or access point(s). These different data networks can include various network types. Additionally, a Wireless Wide Area Network (WWAN) may be a Code Division. Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LIE, LTE Advanced, and so on, including 4G and 5G technologies.

The ECU 660 can further include sensor controller(s) 674. Such controllers can control, without limitation, one or more sensors of the vehicle, including, among others, one or more accelerometer(s), gyroscope(s), camera(s), radar(s), LiDAR(s), odometric sensor(s), and ultrasonic sensor(s), as well as magnetometer(s), altimeter(s), microphone(s), proximity sensor(s), light sensor(s), and the like. In an example, the one or more sensors includes a microphone(s) configured to measure ambient vehicle cabin noise, the measured ambient vehicle cabin noise being provided to the processing circuitry 661 for incorporation within the methods of the present disclosure.

Embodiments of the ECU 660 may also include a Satellite Positioning System (SPS) receiver 671 capable of receiving signals 673 from one or more SPS satellites using an SPS antenna 672. The SPS receiver 671 can extract a position of the device, using various techniques, from satellites of an SPS system, such as a global navigation satellite system (GNSS) (e.g., Global Positioning System (GPS)), Galileo over the European Union, GLObal NAvigation Satellite System (GLONASS) over Russia, Quasi-Zenith Satellite System (QZSS) over Japan, Indian Regional Navigational Satellite System (IRNSS) over India, Compass/BeiDou over China, and/or the like. Moreover, the SPS receiver 671 can be used by various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The ECU 660 may further include and/or be in communication with a memory 1269. The memory 669 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 669 of the ECU 660 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended Figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium, Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, apparatuses, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method for modulating an audio output of a microphone array, comprising receiving two or more audio signals from two or more microphone capsules in the microphone array, each audio signal comprising a response to acoustic stimuli in an environment perceived by a respective microphone capsule of the microphone array, estimating an acoustic noise contribution level of the environment based on the received audio signals, estimating a voice contribution level of the environment based on the received audio signals, and determining, by processing circuitry, a direct voice contribution level of the environment based on the estimated acoustic noise contribution level of the environment and the estimated voice contribution level of the environment.

(2) The method of (1), wherein the estimating the acoustic noise contribution level of the environment estimates the acoustic noise contribution level based on an output of a beamformer applied to an audio signal received from the microphone array, a null of a polar pattern of the applied beamformer being directed at a speech origin.

(3) The method of either (1) or (2), wherein the estimating the voice contribution level of the environment estimates the voice contribution level based on an output of a beamformer applied to an audio signal received from the microphone array, a lobe of a polar pattern of the applied beamformer being directed at a speech origin in order to receive direct speech.

(4) The method of any one of (1) to (3), wherein the determined direct voice contribution level of the environment includes at least a portion of an output of one or more of a plurality of beamformers.

(5) The method of any one of (1) to (4), wherein the determined direct voice contribution level of the environment maximizes a signal to noise ratio of the microphone array by minimizing contributions of the estimated acoustic noise contribution level.

(6) The method of any one of (1) to (5), wherein the determining determines the direct voice contribution level of the environment by filtering the estimated voice contribution level of the environment according to the estimated acoustic noise contribution level of the environment.

(7) The method of any one of (1) to (6), wherein the filtering filters the estimated voice contribution level of the environment by applying an adaptive filter having coefficients updated by comparing an impulse response of a speech component of the estimated acoustic noise contribution level of the environment to an impulse response of speech reflections acquired from a database, the adaptive filter coefficients being updated when there is a correlation between the impulse response of the speech component and the impulse response of the speech reflections above a predetermined threshold.

(8) The method of any one of (1) to (7), wherein the filtering filters the estimated voice contribution level of the environment based on an audio signal received from a voice activity detector.

(9) An apparatus for modulating an audio output of a microphone array, comprising processing circuitry configured to receive two or more audio signals from two or more microphone capsules in the microphone array, each audio signal comprising a response to acoustic stimuli in an environment perceived by a respective microphone capsule of the microphone array, estimate an acoustic noise contribution level of the environment based on the received audio signals, estimate a voice contribution level of the environment based on the received audio signals, and determine a direct voice contribution level of the environment based on the estimated acoustic noise contribution level of the environment and the estimated voice contribution level of the environment.

(10) The apparatus of (9), wherein the processing circuitry is configured to estimate the acoustic noise contribution level based on an output of a beamformer applied to an audio signal received from the microphone array, a null of a polar pattern of the applied beamformer being directed at a speech origin.

(11) The apparatus of either (9) or (10), wherein the processing circuitry is configured to estimate the voice contribution level based on an output of a beamformer applied to an audio signal received from the microphone array, a lobe of a polar pattern of the applied beamformer being directed at a speech origin in order to receive direct speech.

(12) The apparatus of any one of (9) to (11), wherein the determined direct voice contribution level of the environment maximizes a signal to noise ratio of the microphone array by minimizing contributions of the estimated acoustic noise contribution level.

(13) The apparatus of any one of (9) to (12), wherein, in order to determine the direct voice contribution level of the environment, the processing circuitry is further configured to filter the estimated voice contribution level of the environment according to the estimated acoustic noise contribution level of the environment.

(14) The apparatus of any one of (9) to (13), wherein, in order to filter the estimated voice contribution level of the environment, the processing circuitry is further configured to apply an adaptive filter having coefficients updated by comparing an impulse response of a speech component of the estimated acoustic noise contribution level of the environment to an impulse response of speech reflections acquired from a database, the adaptive filter coefficients being updated when there is a correlation between the impulse response of the speech component and the impulse response of the speech reflections above a predetermined threshold.

(15) A non-transitory computer-readable storage medium storing computer-readable instructions that, when executed by a computer, cause the computer to perform a method for modulating an audio output of a microphone array, the method comprising receiving two or more audio signals from two or more microphone capsules in the microphone array, each audio signal comprising a response to acoustic stimuli in an environment perceived by a respective microphone capsule of the microphone array, estimating an acoustic noise contribution level of the environment based on the received audio signals, estimating a voice contribution level of the environment based on the received audio signals, and determining a direct voice contribution level of the environment based on the estimated acoustic noise contribution level of the environment and the estimated voice contribution level of the environment.

(16) The non-transitory computer-readable storage medium of (15), wherein the estimating the acoustic noise contribution level of the environment estimates the acoustic noise contribution level based on an output of a beamformer applied to an audio signal received from the microphone array, a null of a polar pattern of the applied beamformer being directed at a speech origin.

(17) The non-transitory computer-readable storage medium of either (15) or (16), wherein the estimating the voice contribution level of the environment estimates the voice contribution level based on an output of a beamformer applied to an audio signal received from the microphone array, a lobe of a polar pattern of the applied beamformer being directed at a speech origin in order to receive direct speech.

(18) The non-transitory computer readable storage medium of any one of (15) to (17), wherein the determined direct voice contribution level of the environment includes at least a portion of an output of one or more of a plurality of beamformers.

(19) The non-transitory computer readable storage medium of any one of (15) to (18), wherein the determined direct voice contribution level of the environment maximizes a signal to noise ratio of the microphone array by minimizing contributions of the estimated acoustic noise contribution level.

(20) The non-transitory computer readable storage medium of any one of (15) to (19), wherein the determining determines the direct voice contribution level of the environment by filtering the estimated voice contribution level of the environment according to the estimated acoustic noise contribution level of the environment.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for modulating an audio output of a microphone array located within a cabin of a vehicle, comprising:
   receiving two or more audio signals from two or more microphone capsules in the microphone array, each of the two or more microphone capsules being located in a different area within the cabin of the vehicle, and each audio signal comprising a response to acoustic stimuli in an environment perceived by a respective microphone capsule of the microphone array;
   estimating an acoustic noise contribution level of the environment based on the received two or more audio signals from the two or more microphone capsules, each of which is located in the different area within the cabin of the vehicle;
   estimating a voice contribution level of the environment based on the received two or more audio signals from the two or more microphone capsules, each of which is located in the different area within the cabin of the vehicle; and
   determining, by processing circuitry, a direct voice contribution level of the environment based on the estimated acoustic noise contribution level of the environment and the estimated voice contribution level of the environment.

2. The method of claim 1, wherein the estimating the acoustic noise contribution level of the environment estimates the acoustic noise contribution level based on an output of a beamformer applied to an audio signal, of the received two or more audio signals, received from the microphone array, a null of a polar pattern of the applied beamformer being directed at a speech origin.

3. The method of claim 1, wherein the estimating the voice contribution level of the environment estimates the voice contribution level based on an output of a beamformer applied to an audio signal, of the received two or more audio signals, received from the microphone array, a lobe of a polar pattern of the applied beamformer being directed at a speech origin in order to receive direct speech.

4. The method of claim 1, wherein the determined direct voice contribution level of the environment includes at least a portion of an output of one or more of a plurality of beamformers.

5. The method of claim 1, wherein the determined direct voice contribution level of the environment maximizes a signal to noise ratio of the microphone array by minimizing contributions of the estimated acoustic noise contribution level.

6. The method of claim 1, wherein the determining determines the direct voice contribution level of the environment by
   filtering the estimated voice contribution level of the environment according to the estimated acoustic noise contribution level of the environment.

7. The method of claim 6, wherein the filtering filters the estimated voice contribution level of the environment by
   applying an adaptive filter having coefficients updated by comparing an impulse response of a speech component of the estimated acoustic noise contribution level of the environment to an impulse response of speech reflections acquired from a database, the adaptive filter coefficients being updated when there is a correlation between the impulse response of the speech component and the impulse response of the speech reflections above a predetermined threshold.

8. The method of claim 6, wherein the filtering filters the estimated voice contribution level of the environment based on an audio signal received from a voice activity detector.

9. An apparatus for modulating an audio output of a microphone array located within a cabin of a vehicle, comprising:
   processing circuitry configured to
      receive two or more audio signals from two or more microphone capsules in the microphone array, each of the two or more microphone capsules being located in a different area within the cabin of the vehicle, and each audio signal comprising a response to acoustic stimuli in an environment perceived by a respective microphone capsule of the microphone array,
      estimate an acoustic noise contribution level of the environment based on the received two or more audio signals from the two or more microphone capsules, each of which is located in the different area within the cabin of the vehicle,
      estimate a voice contribution level of the environment based on the received two or more audio signals from the two or more microphone capsules, each of which is located in the different area within the cabin of the vehicle, and
      determine a direct voice contribution level of the environment based on the estimated acoustic noise contribution level of the environment and the estimated voice contribution level of the environment.

10. The apparatus of claim 9, wherein the processing circuitry is configured to estimate the acoustic noise contribution level based on an output of a beamformer applied to an audio signal, of the received two or more audio signals, received from the microphone array, a null of a polar pattern of the applied beamformer being directed at a speech origin.

11. The apparatus of claim 9, wherein the processing circuitry is configured to estimate the voice contribution level based on an output of a beamformer applied to an audio signal, of the received two or more audio signals, received from the microphone array, a lobe of a polar pattern of the applied beamformer being directed at a speech origin in order to receive direct speech.

12. The apparatus of claim 9, wherein the determined direct voice contribution level of the environment maximizes a signal to noise ratio of the microphone array by minimizing contributions of the estimated acoustic noise contribution level.

13. The apparatus of claim 9, wherein, in order to determine the direct voice contribution level of the environment, the processing circuitry is further configured to filter the estimated voice contribution level of the environment according to the estimated acoustic noise contribution level of the environment.

14. The apparatus of claim 13, wherein, in order to filter the estimated voice contribution level of the environment, the processing circuitry is further configured to apply an adaptive filter having coefficients updated by comparing an impulse response of a speech component of the estimated acoustic noise contribution level of the environment to an impulse response of speech reflections acquired from a database, the adaptive filter coefficients being updated when there is a correlation between the impulse response of the speech component and the impulse response of the speech reflections above a predetermined threshold.

15. A non-transitory computer-readable storage medium storing computer-readable instructions that, when executed by a computer, cause the computer to perform a method for modulating an audio output of a microphone array located within a cabin of a vehicle, the method comprising:

receiving two or more audio signals from two or more microphone capsules in the microphone array, each of the two or more microphone capsules being located in a different area within the cabin of the vehicle, and each audio signal comprising a response to acoustic stimuli in an environment perceived by a respective microphone capsule of the microphone array;

estimating an acoustic noise contribution level of the environment based on the received two or more audio signals from the two or more microphone capsules, each of which is located in the different area within the cabin of the vehicle;

estimating a voice contribution level of the environment based on the received two or more audio signals from the two or more microphone capsules, each of which is located in the different area within the cabin of the vehicle; and determining a direct voice contribution level of the environment based on the estimated acoustic noise contribution level of the environment and the estimated voice contribution level of the environment.

16. The non-transitory computer-readable storage medium of claim 15, wherein the estimating the acoustic noise contribution level of the environment estimates the acoustic noise contribution level based on an output of a beamformer applied to an audio signal, of the received two or more audio signals, received from the microphone array, a null of a polar pattern of the applied beamformer being directed at a speech origin.

17. The non-transitory computer-readable storage medium of claim 15, wherein the estimating the voice contribution level of the environment estimates the voice contribution level based on an output of a beamformer applied to an audio signal, of the received two or more audio signals, received from the microphone array, a lobe of a polar pattern of the applied beamformer being directed at a speech origin in order to receive direct speech.

18. The non-transitory computer readable storage medium of claim 15, wherein the determined direct voice contribution level of the environment includes at least a portion of an output of one or more of a plurality of beamformers.

19. The non-transitory computer readable storage medium of claim 15, wherein the determined direct voice contribution level of the environment maximizes a signal to noise ratio of the microphone array by minimizing contributions of the estimated acoustic noise contribution level.

20. The non-transitory computer readable storage medium of claim 15, wherein the determining determines the direct voice contribution level of the environment by filtering the estimated voice contribution level of the environment according to the estimated acoustic noise contribution level of the environment.

* * * * *